April 12, 1938.   C. G. OLSON   2,113,600
THREADED FASTENER
Filed April 19, 1937   2 Sheets-Sheet 1
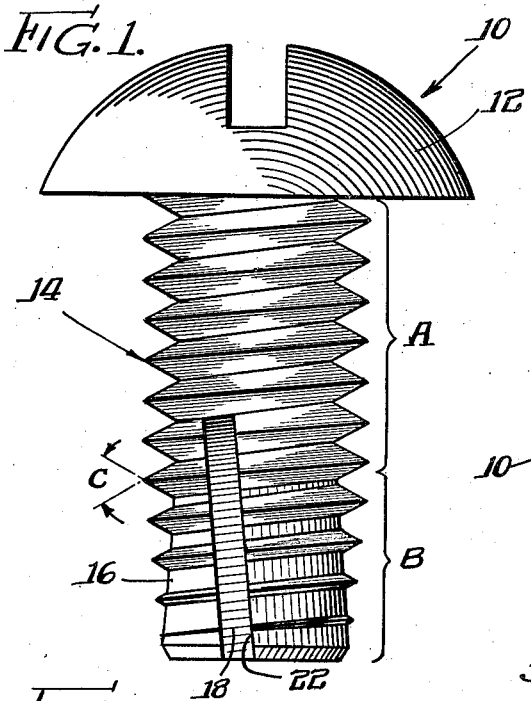
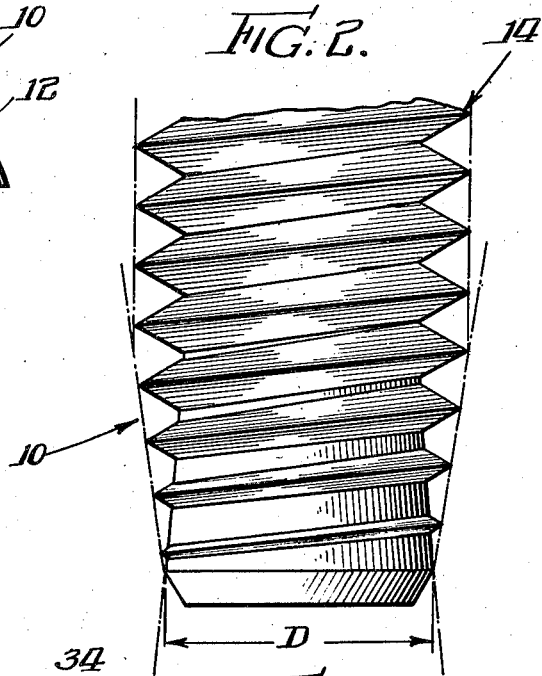
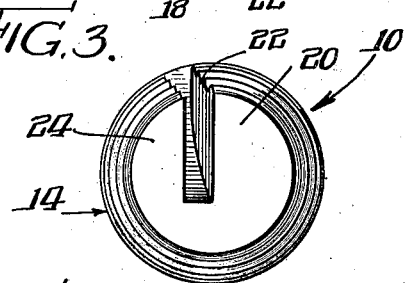
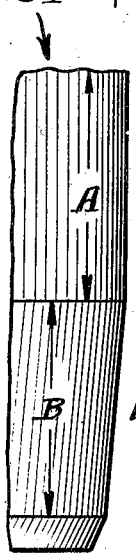
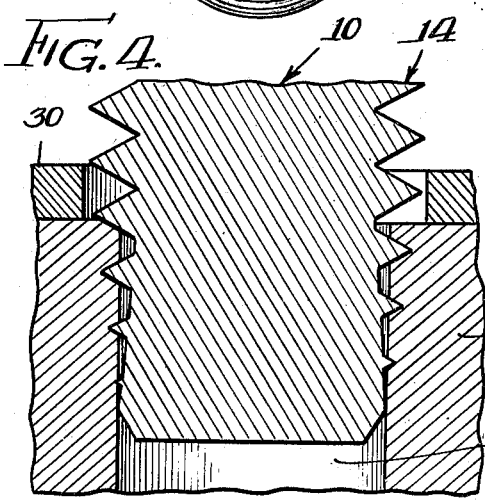
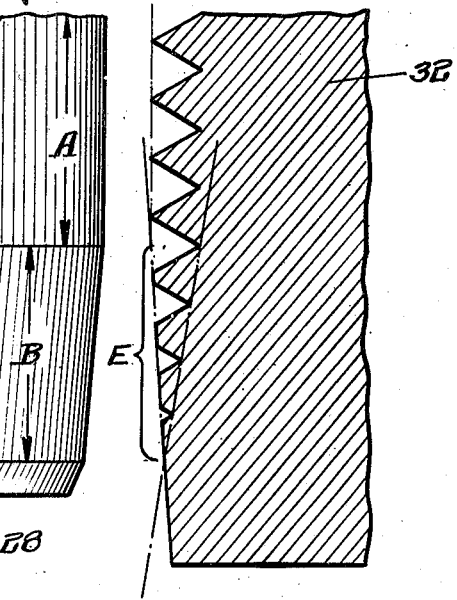
Inventor
Carl G. Olson
By:- Cox & Moore attys.

April 12, 1938.  C. G. OLSON  2,113,600
THREADED FASTENER
Filed April 19, 1937  2 Sheets-Sheet 2

Inventor
Carl G. Olson
By:- Cox & Moore
attys

Patented Apr. 12, 1938

2,113,600

UNITED STATES PATENT OFFICE 2,113,600

THREADED FASTENER

Carl G. Olson, Chicago, Ill., assignor to Illinois Tool Works, Chicago, Ill., a corporation of Illinois Application April 19, 1937, Serial No. 137,720

14 Claims. (Cl. 85—47)

This invention relates generally to threaded fasteners, and more particularly to threaded fasteners of the self-tapping type provided with rolled threads.

It is an important object of the present invention to provide a tapping or thread-forming screw which is so constructed at the entering end thereof as to materially facilitate its initial application to an unthreaded aperture in a work piece.

A further object of the invention is to present a screw, as set forth above, in which the thread on the thread-forming extremity and the juxta-positioned core portions of the screw present a novel construction which materially contributes toward the efficient functioning of the screw when applied to an unthreaded aperture in a work piece.

More specifically the present invention contemplates a screw in which the core portion thereof at the entering extremity tapers reversely with respect to the thread taper in that vicinity. That is to say, a screw in which the core becomes larger toward the entering end and the external or crest diameter of the thread thereon decreases.

Still another object of the invention is to provide a screw of the type referred to above in which a thread of diminished height on the entering portion of the screw facilitates initial positioning of the screw in an unthreaded aperture before the thread-forming operation takes place.

The foregoing and numerous other objects and advantages will be more apparent from the following detailed description when considered in connection with the accompanying drawings, wherein—

Figure 1 is a side elevational view of a screw which represents one embodiment of the present invention;

Figure 2 is an enlarged fragmentary portion of the lower section of the tapping screw, said view being taken from the rear of Figure 1;

Figure 3 is a bottom elevational view of the screw shown in Figure 1 to more clearly illustrate the disposition of the longitudinal recess therein;

Figure 6:
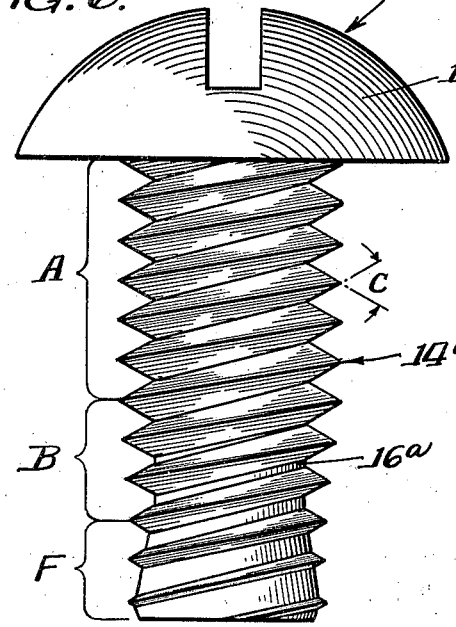
Figure 8:
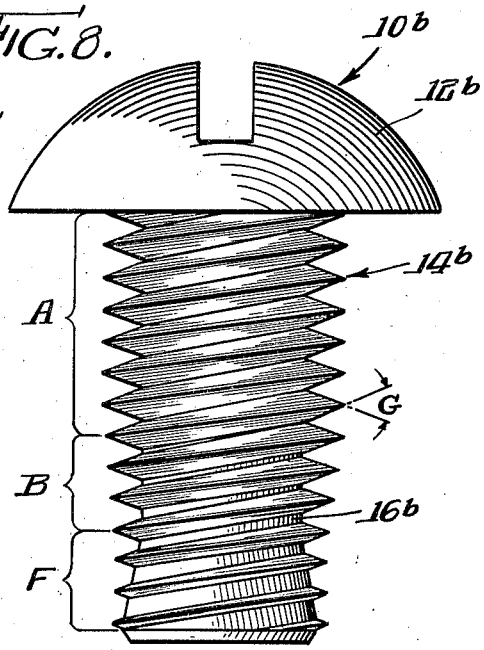
Figure 7:
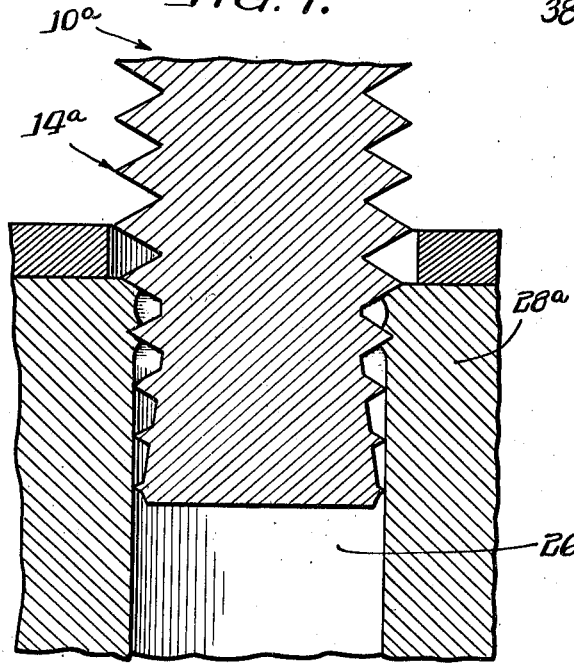
Figure 9:
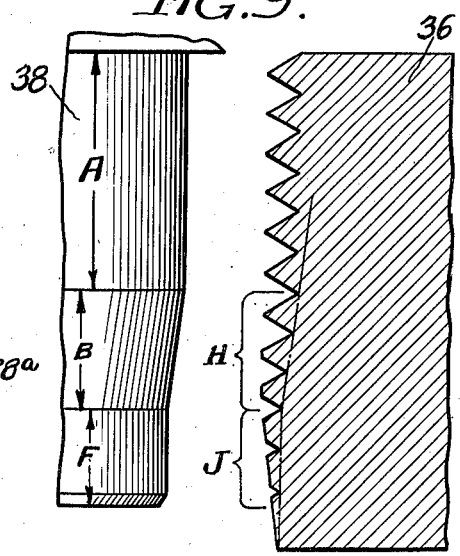

Figure 4 discloses a fragmentary portion of the screw during its initial thread-forming or tapping operation within a work piece, the associated parts being shown in section to more clearly illustrate the invention;

Figure 5 discloses a fragmentary portion of a screw blank and thread rolling die to more clearly illustrate the manner in which the thread on the thread-forming or tapping portion of the screw is formed;

Figure 6 discloses a modified thread-forming screw contemplated by the present invention in which the crest diameter of the thread convolutions at the entering end of the screw are uniform, said screw being provided with a multiple as distinguished from a single thread;

Figure 7 is a view similar to Figure 4 disclosing the manner in which the screw of Figure 6 is initially applied to an unthreaded aperture of a work piece;

Figure 8 presents still another modified screw contemplated by the present invention in which the thread is sharper than the standard machine screw thread, the screw in all other respects conforming with the screw shown in Figure 6; and Figure 9 discloses a fragmentary portion of a screw blank and thread rolling die to illustrate the manner in which the screw of Figure 6 may be formed.

Referring now to the drawings more in detail, wherein like numerals have been employed to designate similar parts throughout the various figures, it will be seen that one embodiment of the invention comprises a screw designated generally by the numeral 10 (Figures 1 to 4 inclusive). This screw 10 includes a suitable head 12 formed integral with a threaded body portion designated generally by the numeral 14. The body 14 is provided with a conventional machine screw thread along the holding portion indicated by the bracket A in Figure 1. The crest diameter of the thread decreases along the thread-forming or tapping portion indicated by the bracket B in Figure 1, said thread along the portion B also decreasing in height with respect to exposed core portions 16. A suitable recess 18, extending longitudinally of the threaded body, separates the entering extremity of the screw into a screw section 20 having a serrated cutting edge 22, and a screw section 24 which is adapted to yield toward the section 20 when the screw is initially inserted within an unthreaded aperture, the yielding of the section 24 serving to increase the cutting effectiveness of the serrated edge 22.

Particular attention is directed to the thread construction along the tapping or thread-forming portion B. The conventional machine screw thread extending along the holding portion A is of uniform height and conforms with any one of the conventional standard machine screw specifications. In other words, the thread on the holding portion is of conventional or standard V-shaped cross section. It will be noted that the exposed core portions 16 begin at the upper extremity of the tapping section B and increase in axial width toward the entering extremity of the screw. These exposed peripheral core portions not only increase in axial width toward the entering end of the screw, but also increase in diameter as they approach the entering end of the screw. This is a structural feature which distinguishes the screw structurally and functionally from commercial forms with which I am familiar, namely, those forms in which the root diameter remains constant or decreases in diameter along the entering or thread-forming portion.

It will be apparent from the foregoing description that the core or body portion of the screw tapers reversely with respect to the tapering of the juxtapositioned thread convolutions. That is to say, as the crest diameter of the thread convolutions on the tapping or thread-forming portion decreases, the diameter of the juxtapositioned core portions increases. These reverse tapering characteristics of the thread and screw body will be apparent from the dot-and-dash lines disclosed in Figure 2.

Attention is also directed to the fact that the axial pitch of the thread on the screw 10 is uniform along both the holding portion A and the thread-forming or tapping portion B. Although the height of the thread on the tapping portion B decreases with respect to the core diameter, the cross sectional contour of the thread portion which is exposed, is uniform with the corresponding exposed portions of the other thread convolutions. Thus, it may be said that the crown of the thread convolutions along the holding and thread-forming or tapping portions remains constant and that the included angle of the thread indicated by the letter C (Figure 1) remains constant throughout the entire length of the screw. By reason of the foregoing thread construction on the tapping portion, the initial thread-forming or cutting operation takes place along a helical path which is disposed centrally with respect to the complete thread which is finally formed in the work. Thus, the cutting action caused by the cutting edges presented on opposite sides of each thread convolution is uniform because the thread is positioned centrally with respect to the complete helix ultimately produced in the work.

Referring to Figure 4, it will be seen that I prefer to insert the screw in an aperture 26 of a work piece 28 which is substantially equal in diameter to the external diameter of the entering extremity of the core 16, said diameter being indicated by the letter D in Figure 2. Thus, the exposed core diameter at the entering end provides a gauge which may be used to determine the size of the hole required for the screw.

It will be understood that screws of the type disclosed herein are hardened sufficiently to enter relatively hard substances, such as metal, without causing any injury or deformation to the thread convolutions. Furthermore, the holding power or capacity of a screw depends upon the stress required to shear the thread either on the screw or in the work, or both. In screws of the type disclosed herein the material of the screw is always stronger than the material of the work. Therefore, in subjecting a screw to a strain which is sufficient to strip the thread, this stripping occurs in the softer material, namely the work, and it will be evident that the stripping must occur at the root of the thread in the work to permit the screw to pull out. This stripping must occur at the root of the thread whether the thread is of full depth, or partial depth and it has been proven that the holding power of a screw is nearly as great with twenty-five per cent thread engagement as it is with full thread engagement provided there is a sufficient number of thread convolutions engaged. In using screws of the type shown herein it is only necessary, therefore, to employ an aperture, such as the aperture 26, which is considerably greater than the root diameter of the thread on the holding portion A. Hence it is possible to employ the entering portion of the exposed core 16 as a gauge for the size of hole to be used in the work.

By having the above described reversed tapered relationship of the thread and exposed core portions at the entering end of the screw, I am able to prevent inadvertent loss of the screw should it become loosened. As the threads on the screw continue to form the complementary thread in the work 28, there is always a tendency for burrs and the like to form which causes a slight reduction in the internal diameter of the aperture 26 after the screw has been finally driven home. In other words, after the head 12 has been turned sufficiently so as to be clamped against a work piece 30, the aperture 26 will have been slightly reduced in diameter due to the presence of burrs and the like resulting from the cutting action of the serrating cutting action 22. Hence the diameter of the aperture 26 in the vicinity of the full thread on the holding portion of the screw will be sufficiently less than the entering diameter D of the core body 16 so as to prevent the screw from being inadvertently lost due to vibration, et cetera. The reverse taper disposition of the thread and core body materially reduces the possibility of losing screws from the work even though the screws may slightly back out of the aperture.

In Figure 5 I have disclosed the manner in which screws of the type shown in Figures 1 to 4 inclusive may be rolled. While the present invention is not directed to the method of rolling the thread on the screw, it is of interest from a practical standpoint at least to observe how these screws may be produced. A thread rolling die 32 of Figure 5 is disclosed in association with a fragmentary portion of a screw blank 34. It will be noted that the screw blank 34 is cylindrical over the portion indicated by the letter A and is tapered over the portion indicated by the letter B, said portions corresponding with the holding and tapping portions respectively of Figure 1. In the actual rolling of the blank 34 a second die companion to and identical with the die 32 is employed, said blank being rolled between the two die blocks. When the blank has been rolled between the die blocks 32, the portion of the die blocks indicated by the bracket E will cause the reverse thread and core body arrangement, previously described, to be formed upon the portion B of the blank.

Referring now to Figures 6 and 7, it will be seen that I have disclosed a modified screw construction indicated generally by the numeral 10a. This screw includes the usual head 12a and threaded body portion 14a. The thread on the body 14a is of conventional machine screw type and is a multiple thread as distinguished from the single thread shown in Figure 1. The screw 10a is provided with a holding portion indicated by the bracket A, a thread-forming or tapping portion indicated by the bracket B, and a piloting or guiding portion indicated by the bracket F. The crest diameter of the thread convolutions along the holding portion A are uniform and the height of the thread is uniform whereas the crest diameter of the thread along the thread-forming or tapping portion B decreases and the height of the thread decreases with respect to exposed core portions 16a. The thread convolutions along the section F are constant in crest diameter, but decrease in height with respect to the core portions 16a. The peripheral exposed core surfaces 16a increase in axial width toward the entering end and also increase in external diameter toward the entering end of the screw similarly to the exposed core surfaces 16 of Figure 1. The screw body 14a of the screw 10a in Figure 6 is not provided with a longitudinal recess, but depends solely upon the imbedding action of the thread convolutions to form a complementary thread in the work. In instances where the provision of a cutting edge will render the screw more efficiently operable, a recess of the type shown in Figures 1 and 3 may be employed.

Referring to Figure 7, it will be seen that the screw 10a is preferably applied to a work piece 20a in which an aperture 26a corresponds in diameter with the crest diameter of the thread convolutions included within the area designated by the bracket F of Figure 6. By having this dimensional relationship between the crest diameter of the thread and the diameter of the unthreaded aperture in the work, an operator may set the screw into the aperture of the work before the screw is actually rotated to form a thread in the work. This type of construction is particularly advantageous in instances where one operator inserts the screw within the hole and another operator subsequently turns the screw into the work. Thus, the screw may be prepositioned and centered within the aperture of the work so as to facilitate subsequent tightening of the screw by the application of a suitable turning tool, such as a power screw driver. The advantages incident to the use of the screw 10a are somewhat similar to those experienced in the use of screw 10. The screw 10a, being of the variety which operates on the "indenting" thread-forming principle as distinguished from the "cutting" thread-forming principle, causes a material decrease in the diameter on the aperture 26a to take place. That is to say, a considerable inward flowing of the metal in the work 20a takes place when the screw 10a is turned within the aperture 26a, and this material decrease in diameter cooperates with the exposed peripheral core portions in preventing the screw from being lost from the work piece. The size of the hole to be used in the work for the screw 10a may be gauged by the crest diameter of the thread convolutions along the portion indicated by the bracket F, Figure 6.

In Figure 8 a further modified screw construction is shown which is designated generally by the numeral 10b. This screw is provided with any suitable conventional head 12b formed integral with a threaded body 14b. The threaded body 14b is provided with a holding portion A in which the thread is of constant height and uniform crest diameter, a thread-forming section B in which the thread decreases in crest diameter and decreases in height along exposed core surfaces 16b, and a guiding portion F wherein the crest diameter of the thread is constant, the thread decreasing in height along the exposed peripheral core surfaces 16b. The screw 10b differs only from the screw 10a in that the thread has a sharper included angle than the included angle indicated by the letter C in Figures 1 and 6. The included angle of the thread on the screw 10b is indicated by the letter G in Figure 8. By having a relatively small included angle G, the ease with which the screw will "indent" its way into the work is enhanced.

In Figure 9, I have shown the manner in which a screw of the type shown in Figures 6 and 8 may be rolled. A pair of die blocks 36 disposed on opposite sides of a screw blank 38 serve to roll the thread in the blank. It will be noted that the blank is provided with a cylindrical section A, a tapering section B and a cylindrical section F. The serrations on the die block 36, indicated by the bracket H, produce the thread convolutions on the thread-forming portion B of the screw and the portion of the dies 36, indicated by the bracket J, form the thread convolutions of constant crest diameter along the section F of the screw.

From the foregoing description it will be apparent that my invention contemplates a novel thread-forming or tapping screw in which the ease of insertion is materially enhanced. By having the reverse taper arrangement, namely, a thread which tapers in crest diameter reversely to the tapering of the juxtapositioned body or core diameter, advantages are obtained over many of the present type commercial tapping screws. By employing the multiple thread construction, the crest of one thread convolution at the entering end of the screw is positioned diametrically opposite the crest of a companion convolution. This diametrical disposition of the thread crests counteracts tendencies for the screw to cant when initially inserted within the unthreaded aperture.

Obviously the invention is not limited to the specific embodiments disclosed herein, but is capable of other modifications and changes without departing from the spirit and scope of the appended claims.

Having thus described my invention, what I claim as new and desire to secure by Letters Patent is:

1. A self-threading fastener including a threaded body having a holding portion and a hardened thread forming portion at one extremity thereof, and a head integral with the opposite extremity of said body, the thread on the thread forming portion decreasing in crest diameter toward the entering end of the fastener to facilitate its initial application to an unthreaded aperture in a work piece, the core diameter of the thread forming portion increasing toward the entering end.

2. A self-threading fastener including a threaded body having a holding portion and a hardened thread forming portion at one extremity thereof, and a head integral with the opposite extremity of said body, the crown along the holding and thread forming portions being of uniform cross-sectional contour, the thread on the thread forming portion decreasing in crest diameter toward the entering end of the fastener to facilitate its initial application to an unthreaded aperture in a work piece, the core diameter of the thread forming portion increasing toward the entering end.

3. A self-threading fastener including a threaded body having a holding portion and a hardened thread forming portion at one extremity thereof, and a head integral with the opposite extremity of said body, the thread along the holding and thread forming portions being of V-shaped cross-section, the thread on the thread forming portion decreasing in crest diameter toward the entering end of the fastener to facilitate its initial application to an unthreaded aperture in a work piece, the core diameter of the thread forming portion increasing toward the entering end.

4. A self-threading fastener including a threaded body having a holding portion and a hardened thread forming portion at one extremity thereof, and a head integral with the opposite extremity of said body, the crest of the thread on the holding and thread forming portions being of uniform axial pitch, the thread on the thread forming portion decreasing in crest diameter toward the entering end of the fastener to facilitate its initial application to an unthreaded aperture in a work piece, the core diameter of the thread forming portion increasing toward the entering end.

5. A self-threading fastener including a threaded body having a holding portion and a hardened thread forming portion at one extremity thereof, a head integral with the opposite extremity of said body, the thread on the thread forming portion decreasing in crest diameter toward the entering end of the fastener to facilitate its initial application to an unthreaded aperture in a work piece, the core diameter of the thread forming portion increasing toward the entering end, and exposed peripheral core surfaces extending between thread convolutions on said thread forming portion.

6. A self-threading fastener including a threaded body having a holding portion and a hardened thread forming portion at one extremity thereof, a head integral with the opposite extremity of said body, the thread on the thread forming portion decreasing in crest diameter toward the entering end of the fastener to facilitate its initial application to an unthreaded aperture in a work piece, the core diameter of the thread forming portion increasing toward the entering end, and exposed peripheral core surfaces of varying axial widths extending between thread convolutions on said thread forming portion.

7. A self-threading fastener including a threaded body having a holding portion and a hardened thread forming portion at one extremity thereof, and a head integral with the opposite extremity of said body, the thread on the thread forming portion decreasing in crest diameter toward the entering end of the fastener to facilitate its initial application to an unthreaded aperture in a work piece, the core diameter of the thread forming portion increasing toward the entering end, said thread forming portion being longitudinally recessed to present a cutting edge, the effective portion of said recess terminating short of the head.

8. A self-threading fastener including a threaded body having a holding portion and a hardened thread forming portion at one extremity thereof, and a head integral with the opposite extremity of said body, the thread on the thread forming portion decreasing in crest diameter toward the entering end of the fastener to facilitate its initial application to an unthreaded aperture in a work piece, the core diameter of the thread forming portion increasing toward the entering end, the thread on said holding and thread forming portions being multiple to facilitate the insertion of the fastener.

9. A self-threading fastener including a threaded body having a holding portion, a hardened thread forming portion and a guiding portion extending beyond said thread forming portion, and a head integral with the opposite extremity of said body, the thread on the thread forming portion decreasing in crest diameter toward the entering end of the fastener to facilitate its initial application to an unthreaded aperture in a work piece, the core diameter of the thread forming portion increasing toward the entering end.

10. A self-threading fastener including a threaded body having a holding portion, a hardened thread forming portion and a guiding portion extending beyond said thread forming portion, and a head integral with the opposite extremity of said body, the thread on the thread forming portion decreasing in crest diameter toward the entering end of the fastener to facilitate its initial application to an unthreaded aperture in a work piece, the core diameter of the thread forming portion increasing toward the entering end, the thread on the guiding portion being of constant crest diameter.

11. A tapping screw fastener including a body having a threaded holding portion and a hardened threaded tapping portion at one extremity thereof, a head integral with the opposite extremity of said body, said tapping portion being longitudinally recessed to present a cutting edge, the effective portion of said recess terminating short of the head, the crown of the thread along the holding and tapping portions being of uniform cross-sectional contour and extending from the vicinity of the head toward the entering end of the fastener, the axial pitch of said thread being uniform, the thread on the tapping portion gradually decreasing in crest diameter toward the entering end to facilitate its initial application to an unthreaded aperture in a work piece, and exposed peripheral core surfaces of varying axial widths extending between thread convolutions on said tapping portion, the diameter of said core surfaces increasing toward the entering end of the fastener.

12. A tapping screw fastener including a body having a threaded holding portion and a hardened threaded tapping portion at one extremity thereof, a head integral with the opposite extremity of said body, said tapping portion being longitudinally recessed to present a cutting edge, the effective portion of said recess terminating short of the head, the thread along the holding portion being of the machine screw type, the axial pitch of said thread on the holding and tapping portions being uniform, the thread on the tapping portion gradually decreasing in crest diameter and cross-section toward the entering end to facilitate its initial application to an unthreaded aperture in a work piece, and exposed peripheral core surfaces extending between thread convolutions on said tapping portion, the diameter of said core surfaces increasing toward the entering end of the fastener.

13. A tapping screw fastener including a body having a threaded holding portion and a hardened threaded tapping portion at one extremity thereof, a head integral with the opposite extremity of said body, said tapping portion being longitudinally recessed to present a cutting edge, the effective portion of said recess terminating short of the head, the thread along the holding portion being of the machine screw type, the axial pitch of said thread on the holding and tapping portions being uniform, the thread on the tapping portion gradually decreasing in crest diameter and cross-section toward the entering end to facilitate its initial application to an unthreaded aperture in a work piece, and exposed peripheral core surfaces extending between thread convolutions on said tapping portion, the diameter of said peripheral core surfaces toward the entering extremity of the fastener being greater than the root diameter of the thread on the holding portion.

14. A tapping screw fastener including a body having a threaded holding portion and a hardened threaded tapping portion at one extremity thereof, a head integral with the opposite extremity of said body, said tapping portion being longitudinally recessed to present a cutting edge, the effective portion of said recess terminating short of the head, said recess providing a yieldable screw section for increasing the cutting effectiveness of said edge when the fastener is applied to an unthreaded aperture, the thread along the holding portion being of the machine screw type, the axial pitch of said thread on the holding and tapping portions being uniform, the thread on the tapping portion gradually decreasing in crest diameter and cross-section toward the entering end to facilitate its initial application to an unthreaded aperture in a work piece, and exposed peripheral core surfaces extending between thread convolutions on said tapping portion, the diameter of said peripheral core surfaces toward the entering extremity of the fastener being greater than the root diameter of the thread on the holding portion.

CARL G. OLSON.